(12) United States Patent
Almagro

(10) Patent No.: US 7,192,524 B2
(45) Date of Patent: Mar. 20, 2007

(54) METHOD FOR PROCESSING SUGAR CANE FILTER CAKE MUD AND EXTRACTING COMPONENT PRODUCTS

(76) Inventor: Rafael Almagro, 9405 Fountainbleau Blvd., #211, Miami, FL (US) 33172

( * ) Notice: Subject to any disclaimer, the term of this patent is extended or adjusted under 35 U.S.C. 154(b) by 0 days.

(21) Appl. No.: 11/040,315

(22) Filed: Jan. 21, 2005

(65) Prior Publication Data

US 2006/0162721 A1    Jul. 27, 2006

(51) Int. Cl.
*B01D 11/00* (2006.01)
(52) U.S. Cl. .......... 210/634; 127/46.1; 127/53; 127/56; 127/57; 210/768; 210/772; 210/774; 210/787; 210/804
(58) Field of Classification Search .......... 210/634, 210/768–774, 787, 804, 806; 127/46.1, 53, 127/56, 57
See application file for complete search history.

(56) References Cited

U.S. PATENT DOCUMENTS

| | | | | |
|---|---|---|---|---|
| 2,548,885 A | * | 4/1951 | Hixson et al. | 554/209 |
| 2,613,147 A | * | 10/1952 | Owen et al. | 71/26 |
| 2,662,907 A | * | 12/1953 | Henn et al. | 554/177 |
| 2,719,858 A | * | 10/1955 | Hill | 552/545 |
| 3,004,992 A | * | 10/1961 | Miller et al. | 552/545 |
| 3,501,346 A | * | 3/1970 | Katzen et al. | 127/56 |
| 3,994,743 A | * | 11/1976 | Paley | 127/48 |

* cited by examiner

*Primary Examiner*—Joseph Drodge
(74) *Attorney, Agent, or Firm*—Akerman Senterfitt; Michael C. Cesarano

(57) ABSTRACT

A process for the continuous treatment of sugar cane filter cane mud separates and extracts components including fiber which can be used as an animal feed or a source of energy generation, lignin, beta-carotene, oil containing a high content of phytosterol, refined wax which is a resource of policosanol and which can also be used for many other established purposes, and resin which can be used an additive in asphalt mixtures and tire manufacturing or can be recycled back into the sugar milling process. The process is self contained, requiring the input only of fresh water and chemical additives to adjust pH and coloration.

8 Claims, 1 Drawing Sheet

METHOD FOR PROCESSING SUGAR CANE FILTER CAKE MUD AND EXTRACTING COMPONENT PRODUCTS

BACKGROUND OF THE INVENTION

This application presents a Process for the complete treatment of sugar cane filter cake mud that separates and extracts its components into usable products. It allows for the efficient elimination of a voluminous amount of waste material of the sugar industry and can be undertaken with relatively low energy consumption and reduced capital and operating investments as compared to existing technologies that employ organic solvents to produce only a crude wax.

For many years, efforts have been made to find practical uses for the byproducts of processed sugar cane. Chief among these is sugar cane filter cake mud. The mud is an abundant material, representing between 3–4% of the total crushed sugar cane. It is also an attractive material for exploitation as it possesses an wide and diverse range of materials and elements (more than 50 have been identified). However this complexity also complicates effective treatment of the mud. Indeed untreated mud ferments within days, and the decay of its components commences at that time.

The sugar industry currently treats the vast bulk of this mud as a waste product thereby incurring handling costs that vary according to the prevailing government environmental regulations. Typically, a portion of the mud is used as a fertilizer within a few miles of the facility that generated the mud. Such use is limited by the costs of transporting the mud and the capacity of soils to accept it. The balance of the mud is usually contained in some sort of closed system such as an oxidation lagoon where it is mixed with water, allowed to decompose and then transported for disposal. These closed systems divert lands from other uses and incur significant maintenance costs.

Policosanol, which is a second generation mud derivate, is one of the useful by-products of sugar cane processing, and is, itself, a valuable substance having a number of beneficial uses. The principal impediment to the widespread use of policosanol, however, is the extremely high cost of producing it. However, by using this refined wax, it is possible to considerably reduce the cost of producing policosanol. Accordingly, policosanol and phytosterols can be a normal production of the process of this invention, which increases the importance of the overall sugar cane industry.

SUMMARY OF THE INVENTION

This process of this invention eliminates the need for current treatment and disposal practices. In its broadest application the invention can by illustrated by way of a facility that warehouses and processes all the available mud generated in a sugar cane cultivation zone. Alternatively the process can be established on a smaller scale, including processing the mud at the site of a sugar mill or other location. The process of this invention effectively closes the industrial cycle of sugar cane production by taking the primary sugar cane by-product for which no practical use has been established and treating it in such a way that all its component parts are inexpensively separated and may then be applied to other uses. These component parts are thereby made available for immediate as well as secondary exploitations, and no wastes need remain at the conclusion of the process. Additionally the process can be readily modified to extract other sub-components as uses for these are identified.

The process delivers the mud sequentially to a series of extractors in each of which the mud is hydrated, heated, and agitated. The resulting mixture is transported from one extractor to another via a series pipes, each having an internal rotary screw feeder to move the mixture to the next extractor. The screw feeder pipes also have perforations in their lower portions to allow gravity to separate and remove liquids that are released from the mixture during transport. Each of the liquids is collected, retained, and re-used during one of the treatment processes. At one stage, the separation of the mixture is induced by placing it in a centrifuge, which causes the separation of resins and waxes. Through the process of this invention, each major component of the mud can be extracted and thereafter used for other purposes. Although pumps are used to move mud and other components through the system, they have been omitted from the drawings and description as being unnecessary to the understanding and practice of the invention.

It is an object of this invention to provide a process whereby sugar cane filter cake mud can be separated into usable components.

It is a further object of this invention to provide a method whereby usable components of sugar cane filter cake mud can be extracted.

It is yet a further object of the invention to provide a process for disposing of otherwise unusable byproducts of sugar cane processing, and in particular for disposing of sugar cane filter cake mud.

These and other objects of the invention will become apparent through the following description of the invention.

DESCRIPTION OF THE PREFERRED EMBODIMENTS

Figure 1:
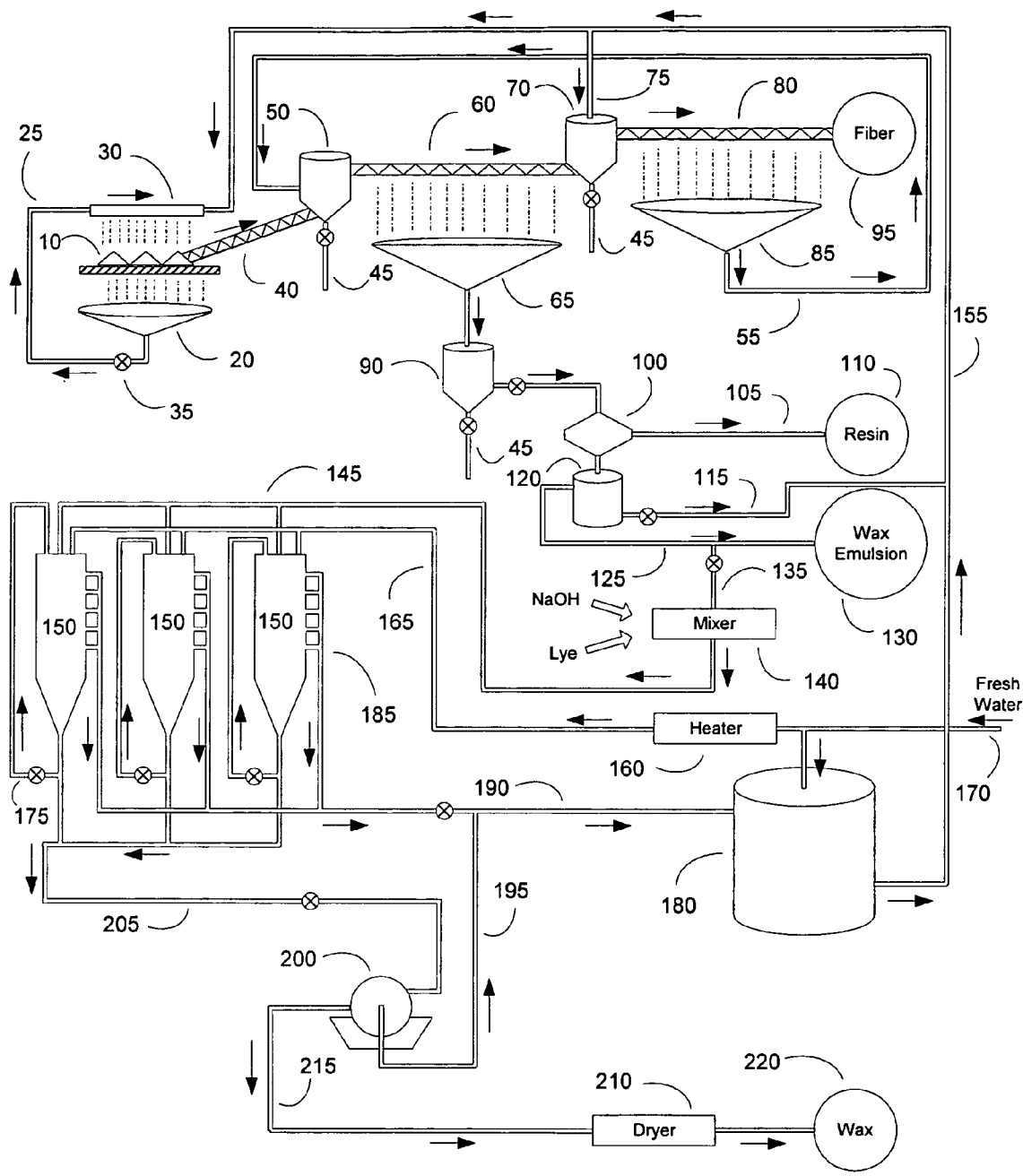
FIG. 1 is a graphical depiction of the process of this invention for treating sugar cane filter cake mud to extract usable components.

The treatment and processing of sugar cane results in waste byproducts that include a substantial amount of sugar cane filter cake mud. FIG. 1 shows the steps of this invention that a mud processing facility can utilize in the processing of this byproduct. Mud is delivered to the facility by sugar mills and processors either by truck or by way of a slurry to an open air patio 10 where it will be stored pending processing. During its storage in the patio, the mud is maintained in a moist state by continuously sprinkling it with recycled runoff water from the patio that is captured and collected in a first collector 20 for delivery to a sprinkler system 30 by means of pipes 25. A number of shutoff valves are used throughout the process to control the volume of liquid being transported. Valve 35 is typical of all shutoff valves used in the process. The use of recycled water retards or prevents fermentation and decay of the unprocessed mud.

The water used for sprinkling the unprocessed mud is similar to "pool water," in that is has an almost neutral pH with a low chlorine content (less than 0.6 measure with an indicator of orthotolidine), which inhibits the mud's fermentation. To facilitate the draining and recycling of this water, the patio is designed with a 1.5% slope with collecting canals in the inferior lateral. This establishes a closed water circuit for the process. In the event that additional water is needed for sprinkling, it may be supplied from water collector tank 180 that also supplies water for second extractor 70 during the process. Excess water from the patio may also be supplied to second extractor 70, as conditions may require.

Processing begins when the mud is fed into a screw feeder 40 which transports it under constant pressure and flow to a first extractor 50. Mud may be delivered to screw feeder 40 by means of a conveyor belt (not shown), or any other suitable means for ensuring a constant supply of mud for the process. Screw feeder 40 is able to maintain a constant flow of mud to first extractor 50. Screw feeder 40 delivers the mud near the bottom of extractor 50, where the mud is mixed with a second stage liquid extract ("extract II") that has been collected later in the process at third collector 85 and transported back to first extractor 50 through pipe 55. Extract II is introduced into first extractor 50 at a ratio to the incoming mud of 1:1 by volume. From time to time, sludge and other residue may be removed from first extractor 50 through cleaning and drainage pipes 45 whose use is controlled by a shutoff valve.

First extractor 50 is a svelte tank where the mixture is subjected to variable agitation (30–60 rpm) and heating with steam at 10-bar pressure to 85–90 degree Celsius. This mix flows continuously such that sand and other heavy impurities are permitted to settle to the bottom of extractor 50 where they may be removed through drainage pipe 45. Otherwise, the mixture exits extractor 50 through an overflow tube located near its top, and is transported via a second screw feeder 60 to second extractor 70. Screw feeder 60 has perforations in the bottom of the pipe of approximately 0.5 mm for draining a first stage liquid extract ("extract I") from the mixture where it is collected in second collector 65. Screw feeder 60 transports the solid phase (a moist fibrous mud) to second extractor 70 while extract I, which is a liquid containing wax emulsion, oil, resin and other components, falls through the perforations in screw conveyor 60 where it is collected 65 and deposited into static decanter tank 90 where remaining sand and other heavy impurities may settle.

The solid phase of the mixture from screw feeder 60 is continuously fed into to a second extractor 70 that is identical to first extractor 50, and where the process described for first extractor 50 above is repeated. Here, however, recycled water from collector tank 180, rather than extract II, is fed into second extractor 70 in a 1:1 ratio by volume. The technical characteristics of the recycled water from collector tank 180 provide the emulsification effect that the lignin exerts on the wax. The high temperature also exercises a positive effect on the emulsification process. When the mixture exits second extractor 70, it is transported via screw feeder 80 having a perforated bottom (0.5 mm). Screw feeder 80 is longer than screw feeders 40 and 60, and transports the fiber to a collection area 95 where it can prepared for animal feed or fuel, or is otherwise disposed of. The liquid ("extract II") that drains from the perforated base of screw feeder 80 is then transported back to first extractor 50 where it is mixed with the mud entering the first extractor 50.

The mud used in the two stage extraction process system is is rich in lignin (and may include some lignosulfonates) that is soluble in water and has a high emulsification power that emulsifies waxes. The extraction phase of the overall process requires minimal equipment and uses the mud's own constituent elements to transfer materials from one medium to another. Additionally, the extraction phase has the advantage of not requiring organic solvents. In mixing any organic solvent with a fibrous and diverse material such as the mud process by this invention, there is an inevitable and increasing loss of the solvent, and an elevated energy consumption for its recuperation, since the solvent is occluded inside the parenchymatous tissue (sponge-like aspects) that is abundant in the mud. This factor may account for the scarce industrialization of the mud under existing technologies.

The primary result of the extraction phase is the creation and collection of extract I, which is initially collected in static decanter tank 90. After being collected, extract I is pumped from static decanter tank 90 to decanter centrifuge 100, which is operated at 70–75 degree centigrade and produces 2800 G to completely separate resin from the remainder of extract I. The resin emerges from the decanter centrifuge as a solid with 75–80% humidity and with the majority of the oils that were present in extract I. This resin is transported via pipe 105 to a collection area 110 where sugar cane oil can be extracted through means well known in the art. The liquid produced by decanter centrifuge 100, "extract III," is an emulsion consisting principally of waxes, lignin emulsified and beta-carotene. Critically, unlike the crude sugar cane wax that is produced under current technology, extract III is almost completely free of oil.

To extract oils from the resin 110, the resin is treated with an organic solvent (i.e. hexane) in an extractor (not shown) that is similar to those used to produce the resin. The resin, after the extraction process is completed, may be separated by simple sedimentation, and the solvent is recovered by evaporation. This extract may be filtered to separate small resin particles and some remaining wax, and the solvent is recovered by evaporation. The sugar cane oil obtained in this manner can be used for different proposes such as animal feed or phytosterols extraction (a second generation mud derivative). Sugar cane oil is rich in phytosterols (free and associated) which are increasing recognized as agents for lowering blood cholesterols levels. These phytosterols can be recovered and added to foods or as a nutritional supplements. Sugar cane oil is a resource not currently used for this purpose, probably because the high costs of current technologies. However, the process of this invention reduces the cost of producing resin and makes further processing of the resin cost-effective. The treated resin can be used as an additive in asphalt or tire manufacturing.

As noted above, decanter centrifuge 100 pumps extract III to static decanter tank 120, which will hold the extract III for approximately six hours. Static decanter tank 120 is operates continuously and is used to provide additional clarification to extract III. Residual particles of resin, small remnant fibers, lignin and beta-carotene are separated in static decanter tank 120 and introduced via line 115 into line 155 which provides liquid from water collector tank 180 to second extractor 70 and storage patio 10.

The resulting wax emulsion remaining in static decanter tank 120 has a solids concentration of 3–4%. In that state, this emulsion can be pumped via line 125 to a collection facility 130 where it can be used to treat fruits without further processing. Alternatively, leaving static decanter tank 120, the wax emulsion may be pumped via lines 125 and 135 to a continuous mixer 140, where the pH is adjusted to a value of 8.5 with NaOH, and lye is added to decolorize lignin and other possible colorants. This mixture also initiates the breaking of the wax emulsion, causing it to separate as it flows into sedimentation tanks 150 through lines 145. The sedimentation tanks 150 are continuously filled, and wax commences to separate immediately. The neutral pH improves sedimentation. The required volumes of lye are small, and are adjusted by volume depending on the lye concentration being used.

Once filled with the wax emulsion, the sedimentation tanks 150 allow the emulsion to stand still for four (4) hours to permit the wax to form sediments. Once the maximum sedimentation of wax is achieved, the clarified, wax free, liquid is removed via lines 185 and sent to a collector tank 180 through line 190 where it is mixed with clean, fresh water 170 and is treated to achieve a neutral pH and chlorine content as such has been previously discussed. Collector tank 180 is one source of water that is recycled via line 155 to moisten the mud stored in the patio 10 and that is used to mix with the mud in extraction tank 70. The liquid in collector tank 180 is also a rich source of lignim and beta-carotene which have health care applications including treatment of arthritis and cystic fibrosis and dietary supplements. Accordingly if desired, these materials can be extracted from the clarified wax free liquid through vacuum evaporation.

The remaining wax is washed whereby clean water heated to 60 degree Celsius in heater 160 is fed to the sedimentation tanks 150 through line 165. Within sedimentation tanks 150, the water and wax are re-circulated via line 175 for 30 minutes. The wax is then allowed to settle for a second time and the clarified liquid is removed and sent to collection tank 180 via lines 185 and 190. A second wash is accomplished by repeating the steps of introducing fresh, heated water into the sedimentation tanks 150 and recirculating the mixture for 30 minutes. Following the second wash, the wax is transported through line 205 to a mechanical separator 200 operating at a temperature of 15–20 degree Celsius that may be a vacuum filter or a centrifuge. Any standing water is eliminated by vacuum evaporation. The wax is then transported through line 215 to dryer 210, then to a collecting facility 220.

Wax obtained in this way is refined—i.e. it is free of oil and resin, has a high esters content and a clear yellow color. Due to its high purity, sugar cane wax refined according to the process of this invention is an excellent base for the production of policosanol.

Having fully explained the steps for processing sugar cane filter cake mud, it may be seen that variations in the steps and parameters may be made to produce useful results without departing from the spirit of the invention, which is limited only by the following claims.

What is claimed is:

1. A process for obtaining useful components from sugar cane filter cake mud comprising the steps of:
   (a) introducing a quantity of sugar cane filter cake mud into a first extractor,
   (b) mixing said mud with a second liquid extract to form a first mixture,
   (c) agitating said first mixture within a first predetermined range of pressure while maintaining said first mixture within a first predetermined range of temperature,
   (d) removing said first mixture at an exit portal in said first extractor,
   (e) transporting said first mixture to an entry portal in a second extractor,
   (f) collecting a first liquid extract from said first mixture during transportation of said first mixture to said second extractor,
   (g) mixing said first mixture with liquid from a water return line in said second extractor to form a first mixture,
   (h) agitating said second mixture within a second predetermined range of pressure while maintaining said first mixture within a second predetermined range of temperature,
   (i) removing said second mixture at an exit portal in said first extractor,
   (j) transporting said second mixture to a first facility for further processing or disposal,
   (k) collecting said second liquid extract from said second mixture during transportation of said second mixture to said first facility,
   (l) delivering said second liquid extract to said first extractor for mixing with said mud to form said first mixture,
   (m) depositing said first liquid extract into a first static decanter tank,
   (n) transporting said first liquid extract from said first static decanter tank to a decanter centrifuge,
   (o) operating said decanter centrifuge within a third predetermined range of temperature and at a centrifugal force sufficient to cause the separation of said first liquid extract to form a resin and a third liquid extract,
   (p) removing said resin and transporting it to a second facility for further processing and disposal,
   (q) transporting said third liquid extract to a second static decanter tank and allowing said third extract to remain within said second static decanter tank for a first predetermined length of time to permit clarification of said third liquid extract into a wax emulsion and other components from said third liquid extract,
   (r) removing said other components from the lower portion of said second static decanter tank and causing said other components to enter a water return line, said water return line providing water from a water collecting tank to said second extractor,
   (s) transporting the wax emulsion to a third facility for collection and disposal or, alternatively,
   (t) transporting the wax emulsion to a mixer for mixing said third liquid extract with additives to cause said third liquid extract to have a pH within a predetermined range of pH values, to adjust the color of said third liquid extract, and to initiate the separation of components comprising said third liquid extract,
   (u) transporting said wax emulsion from said mixer to one or more sedimentation tanks,
   (v) allowing said wax emulsion to remain in said one or more sedimentation tanks for a second predetermined period of time during which wax will separate and collect within said one or more sedimentation tanks, and leaving a substantially wax-free liquid,
   (w) washing said wax by recirculating liquid within said one or more sedimentation tanks and optionally by introducing fresh water into said one or more sedimentation tanks,
   (x) drawing said substantially wax-free liquid from said one or more sedimentation tanks and transporting said substantially wax-free liquid to said water collection tank,
   (y) transporting said wax to a mechanical separator for elimination of water, and
   (z) transporting said wax to a fourth facility for collection.

2. A process for obtaining useful components from sugar cane filter cake mud as claimed in claim 1, further comprising the step of collecting and storing said sugar cane filter cake mud on a patio before said sugar cane filter cake mud is processed, said collected and stored sugar cane filter cake mud being continuously moistened with water runoff from said patio and with water from said water return line.

3. A process for obtaining useful components from sugar cane filter cake mud as claimed in claim 2, further comprising said first and second predetermined ranges of pressure being approximately 10-bar, and said first and second predetermined ranges of temperature being approximately 85–90 degrees Celsius.

4. A process for obtaining useful components from sugar cane filter cake mud as claimed in claim 3, further comprising said first and said second mixtures being continuously agitated at variable rates of agitation ranging from approximately 30 to approximately 60 revolutions per minute.

5. A process for obtaining useful components from sugar cane filter cake mud as claimed in claim 4, further comprising said first predetermined length of time being approximately six (6) hours, and said second predetermined length of time being approximately four (4) hours.

6. A process for obtaining useful components from sugar cane filter cake mud as claimed in claim 5, further comprising said first mixture having a ratio of one part by volume of sugar cane filter cake mud to one part by volume of said second liquid extract, and said second mixture having a ratio of one part by volume of said first mixture to one part by volume of said water from said water return line.

7. A process for obtaining useful components from sugar cane filter cake mud as claimed in claim 6, further comprising said additives including lye and NaOH.

8. A process for obtaining useful components from sugar cane filter cake mud as claimed in claim 7, further comprising said fresh water introduced into said one or more sedimentation tanks being heated to a temperature of approximately 60 degrees Celsius.

* * * * *